April 20, 1954  E. J. PATTERSON  2,675,748
CULTIVATOR AND PULVERIZER
Filed Feb. 27, 1951  3 Sheets-Sheet 1

INVENTOR
Edie J. Patterson

BY
ATTORNEYS

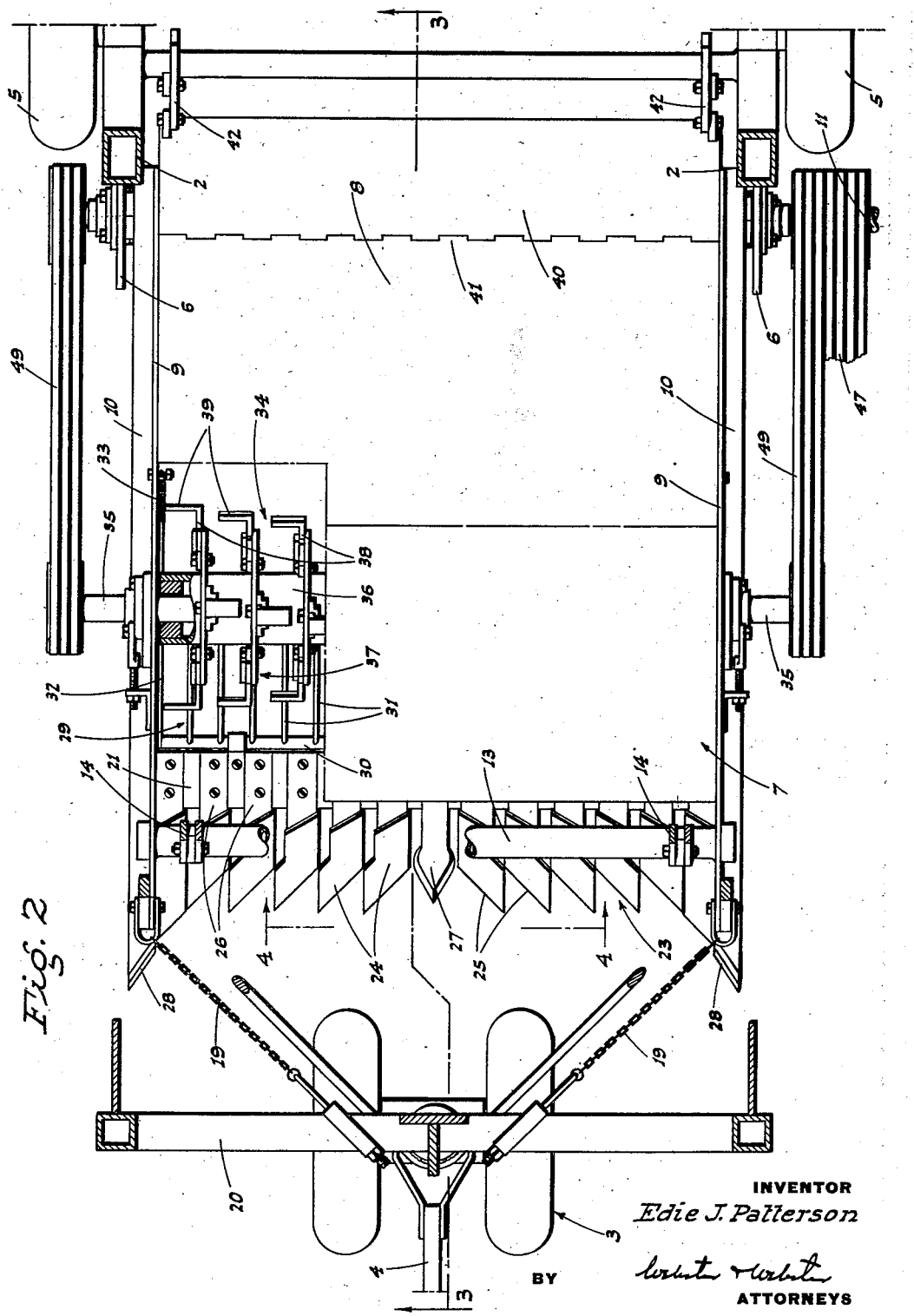

April 20, 1954
E. J. PATTERSON
2,675,748
CULTIVATOR AND PULVERIZER
Filed Feb. 27, 1951
3 Sheets-Sheet 3
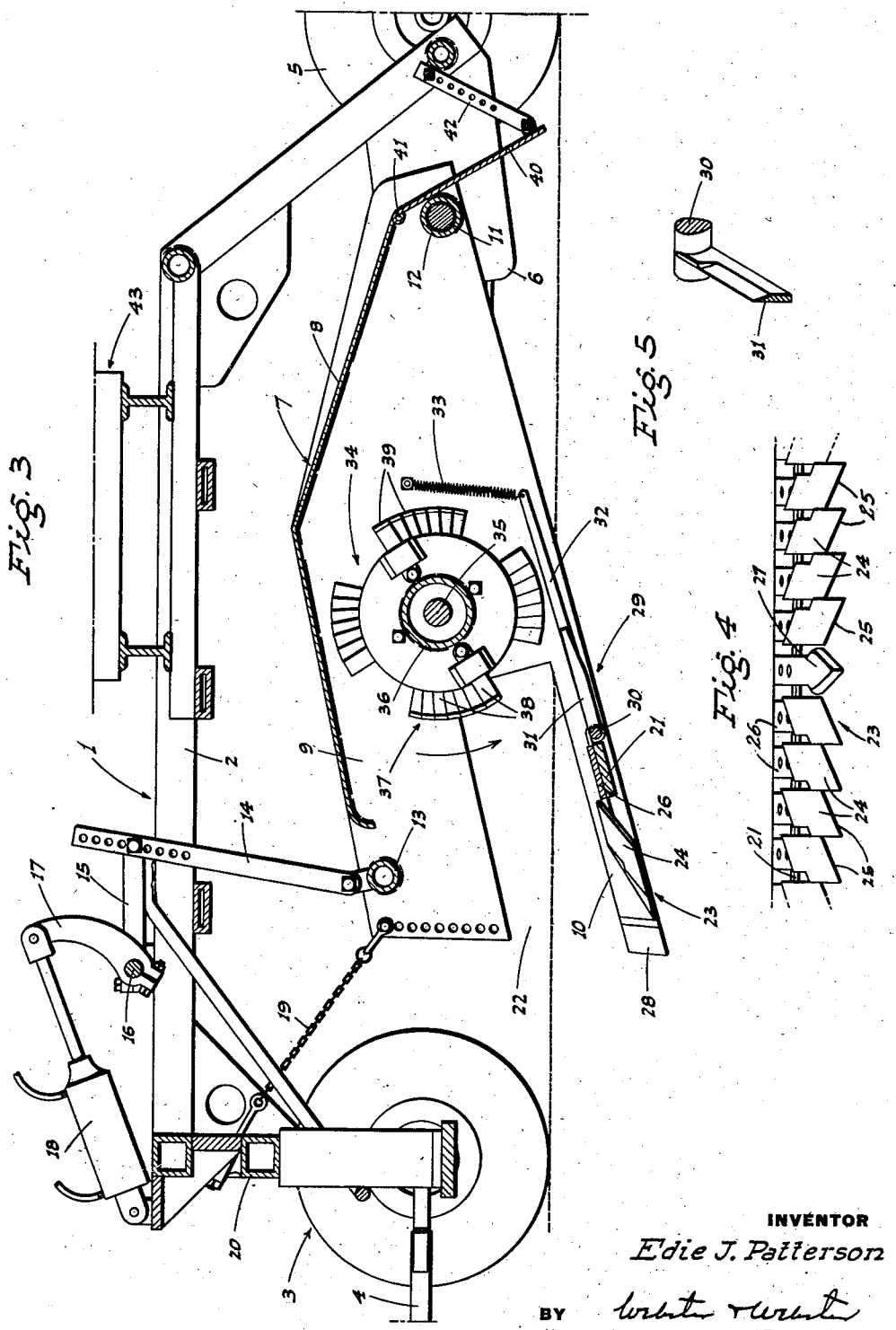
INVENTOR
Edie J. Patterson
BY
ATTORNEYS Patented Apr. 20, 1954

2,675,748

UNITED STATES PATENT OFFICE 2,675,748

CULTIVATOR AND PULVERIZER

Edie J. Patterson, Stockton, Calif., assignor of one-half to Edward Garvey, Stockton, Calif.

Application February 27, 1951, Serial No. 212,945

5 Claims. (Cl. 97—10)

This invention is directed to, and it is a major object to provide, a novel power driven, rotary plow or cultivator.

Another important object is to provide a rotary cultivator which embodies a novel assembly of earth digging and elevating plows, longitudinal cutter blades to the rear of the plows, and a driven chopping rotor mounted above the cutter blades in cooperating relation thereto; such assembly functioning to accomplish relatively deep plowing with a maximum of earth chopping or pulverization of the dug earth before it is redeposited.

A further object of the invention is to provide a rotary cultivator which includes a vertically adjustable deflector hood which serves as the mount for the assembly of the plows, cutter blades, and rotor; such parts thus being vertically adjustable in unison with the hood whereby when the plowing depth of the implement is altered, all of such working parts remain in the same relative positions.

An additional object of the invention is to provide a rotary cultivator which is operative to produce a fully cultivated, pulverized, loose soil seed bed with only one pass along the ground; the implement thus being economical, and effective to prepare a seed bed in a minimum of time.

It is also an object of the invention to provide a rotary cultivator which is designed for ease and simplicity of manufacture; the implement being sturdy, and when in use requiring little maintenance or servicing.

Still another object of the invention is to provide a practical and reliable rotary cultivator, and one which will be exceedingly effective for the purpose for which it is designed.

These objects are accomplished by means of such structure and relative arrangement of parts as will fully appear by a perusal of the following specification and claims.

In the drawings:

Fig. 2 is a sectional plan of the implement on line 2—2 of Fig. 1.

Fig. 3 is a longitudinal sectional elevation on line 3—3 of Fig. 2, showing the earth working parts as lowered to working position.

Fig. 4 is a fragmentary front view of the plow unit; the view being taken on line 4—4 of Fig. 2.

Fig. 5 is a perspective view of one of the longitudinal cutter blades of the grate.

Figure 1:
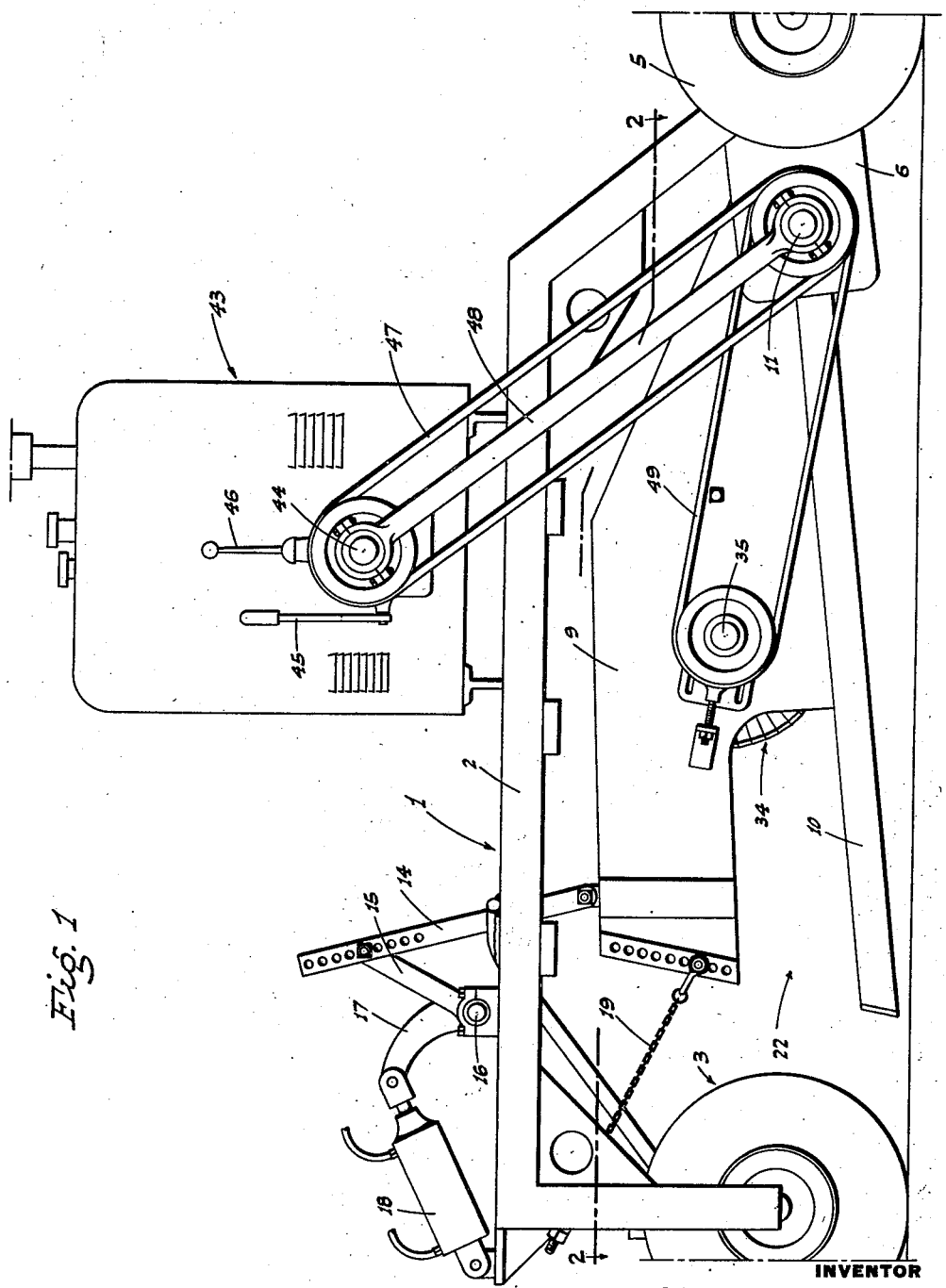
Fig. 1 is a side elevation of the implement, with the earth working assembly in raised, nonworking or transport position.

Referring now more particularly to the characters of reference on the drawings, the cultivator comprises an elongated main frame, indicated generally at 1, of arch type; such main frame including transversely spaced side beams 2 suitably connected together in the length thereof.

At the front the main frame 1 is supported by a central front wheel truck 3 which includes a forwardly projecting tongue 4 adapted to couple to a tractor in draft relation.

At the rear the main frame 1 is supported by transversely spaced rear wheels 5.

The numeral 6 indicates a pair of transversely spaced, forwardly projecting mounting plates fixedly secured in the main frame 1 at the rear lower portion thereof.

An elongated, longitudinally extending hood, indicated generally at 7, is disposed within the confines of the main frame 1; i. e. centrally below the side beams 2. The hood 7 includes a top 8 and sides 9; the sides along the lower edge portion thereof being reinforced by side beams 10.

A driven shaft 11 is journalled in connection with, and extends between, mounting plates 6, and at its rear end the hood 7 includes a transverse sleeve 12 which surrounds said shaft so that the rear end of the hood is supported therefrom; the hood thus being vertically adjustable about said shaft as an axis.

The hood 7 is vertically adjustably suspended from the forward part of the main frame 1, as follows:

A cross bar 13 extends between the sides 9 adjacent the front upper corners thereof, and lift links 14 are pivoted to, and extend upward from, said cross bar to adjustable connection with lever arms 15 which radiate from a cross shaft 16 journaled on and spanning between the side beams 2. The cross shaft 16 includes a central lever arm 17, and a double-acting, fluid pressure energized power cylinder or ram 18 connects between a forward point on the main frame 1, and the upper end of the lever arm 17. Actuation of the power cylinder 18 in one direction or the other under the control of a valve regulated, fluid pressure conduit system (not shown) causes up or down adjustment of the hood 7 through the medium of the described connecting mechanism.

In order to relieve the power cylinder 18 of the load when the hood 7 is lowered to its ground engaging working position, a pair of forwardly and upwardly converging suspension and antisway chains 19 connect between the front ends of corresponding sides 9 and the front cross beam 20 of the main frame 1. The connection of the chains 19 with the sides 9 is vertically adjustable, so that the maximum depth of plowing may be predetermined.

The hood 7, in addition to serving as such, is a sufficiently strong and rigid structure to carry the working parts of the cultivator, as follows:

Adjacent, but short of, the front end of the hood 7 it is fitted—at the bottom—with a rigid cross bar 21 which extends between the sides 9; such sides, at the forward portion and for a distance above the side beams 10, being cut away, as at 22.

A transversely extending earth digging and elevating plow unit, indicated generally at 23, is mounted in connection with, and projects forwardly from, the cross bar 21; such plow unit including flat but canted plows 24 having diagonal front edges 25. The plows 24 are carried on shanks 26 which are rigidly secured to the cross bar 21. A heavy-duty central ripper tooth 27 is mounted in connection with the cross bar 21 and projects forwardly, while the front ends of the side beams 10 likewise carry plow blades 28.

With advance of the implement, with the hood 7 lowered to working position, the plow unit 23, working at predetermined depth, digs up a constantly relatively rearwardly flowing layer of earth which is delivered over the cross bar 21 onto a transversely extending grate, indicated generally at 29. The grate 29 comprises a blade mounting cross shaft 30 journaled on and extending between the sides 9 of the hood 7 immediately to the rear of the cross bar 21, and a plurality of longitudinal cutter blades 31 are fixed in spaced relation to the cross shaft 30 and project rearwardly therefrom; such blades being sharpened on their upper edge, as shown.

Side arms 32 are fixed to opposite end portions of the cross shaft 30 and project rearwardly; tension springs 33 connecting between the rear ends of said side arms 32 and elevated points on the sides 9. With this arrangement the springs 33 normally maintain the grate 29 in a position generally parallel to the lower edges of the sides 9, yet permit of downward yielding of the grate when necessary.

The dug earth which delivers over the cross bar 21 onto the grate 29 is chopped and pulverized by a driven rotor, indicated generally at 34, above said grate. The rotor 34 includes a center shaft 35 which is journaled on and extends between the sides 9, and a drum 36 is carried by said shaft between said sides.

The drum 36 is fitted with a multiplicity of adjacent but transversely spaced earth working spinners 37, each including a plurality of circumferentially spaced, radial shanks 38 having laterally extending cutters 39 on the ends; corresponding shanks and cutters of the respective spinners 37 being progressively circumferentially spiraled in the manner clearly shown in Fig. 3.

As the dug earth is delivered onto the grate 29, the spinners 37 act thereon to effectively chop and pulverize such earth, which chopping or pulverizing action is enhanced by the sharpened upper edges of the cutter blades 31 of said grate.

From the rotor 34 the chopped pulverized earth is discharged rearwardly with considerable force, but is maintained against undesirable escape by the hood 7, thus falling back onto the ground as a well conditioned seed bed.

As will be seen from Figs. 3 and 4, the sloping position and cant of the diagonal edged plows 24 disposes them so that they cut deeper at the point than at the back and thus form a number of longitudinal troughs in the ground, which act to hold and prevent any lateral runoff of underground water.

In order to level such seed bed, the rear end of the hood 7 is comprised—at the lower portion —of an upstanding, transversely extending baffle or deflector plate 40 hinged, at its upper edge— as at 41—for adjustment. Adjustment arms 42 connect between the plate 40 and adjacent rear portions of the main frame 1, whereby said plate can be set at a selected downward and rearward incline, which also regulates the elevation of the lower edge of said plate. As the implement advances, the plate 40 serves to strike the chopped and pulverized soil to a predetermined level and to smooth the seed bed.

The rotor 34 is driven, at relatively high speed and in a direction so that it turns downwardly at the front, as follows:

An engine and transmission unit, indicated generally at 43, is mounted transversely atop the main frame 1 and includes an output shaft 44, a clutch control lever 45, and a transmission shifting lever 46.

An endless multiple belt and pulley unit 47 connects the output shaft 44 to the rear cross shaft 11; there being a spanner bar 48 journaled between such shafts in order to relieve the same of strain.

In turn, the rear cross shaft 11 is connected in driving relation, on opposite sides of the hood 7, to the center shaft 35 of the rotor 34 by endless, multiple belt and pulley units 49. With this driving arrangement power is effectively imparted to the rotor 34, yet without hindering vertical adjustment of the hood 7 and the working parts mounted therein.

The invention provides a very practical and reliable rotary cultivator; being an implement capable of working under varied types of soil conditions and irrespective of crop remainder, such as chaff, stalks, etc. lying on the surface of the ground.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A cultivator comprising a main frame supported for movement along the ground, a mount carried by the main frame adjacent the ground, a transversely extending plow unit secured to the mount in position to work in the ground, a transversely extending grate secured to the mount rearwardly of the plow unit in position to receive earth dug by the latter, and a driven earth chopping rotor journaled in the mount in a plane above and in cooperating relation to the grate; the grate including a plurality of longitudinal cutter blades; a cross shaft journaled in the mount, the cutter blades being fixed to and projecting rearward from the cross shaft, and means yieldably resisting turning of the cross shaft in a direction to lower said cutter blades.

2. A cultivator, as in claim 1, in which said yieldable means comprises an arm radiating from an end of the cross shaft, and a spring connected between said arm and the mount.

3. A cultivator comprising a main frame supported for movement along the ground, a longitudinal hood mounted in the frame adjacent the ground, the hood including a top and sides, a cross bar spanning between the sides adjacent the bottom and front thereof, a transversely extending earth digging plow unit secured to and projecting forward from the cross bar, a transversely extending grate, means securing the grate in connection with the sides and projecting rearward from adjacent the cross bar, the grate including spaced longitudinal cutter bars, and the grate securing means being a cross shaft journaled on and extending between the sides, the blades being attached at their forward ends to said shaft, means yieldably resisting turning of the cross shaft in a direction to lower the cutter bars, and a driven earth chopping rotor journaled on and extending between the sides in a plane above and in cooperative relation to the grate.

4. A cultivator comprising a main frame supported for movement along the ground, a longitudinal hood mounted in the frame adjacent the ground, the hood including a top and sides, a cross bar spanning between the sides adjacent the bottom and front thereof, a transversely extending earth digging plow unit secured to and projecting forward from the cross bar, a cross shaft journaled on and extending between the sides, a plurality of transversely spaced longitudinal cutter blades affixed to the cross shaft and projecting rearward therefrom, means resisting turning of the cross shaft in a direction tending to lower the cutter blades, and a driven earth chopping rotor journaled on and extending between the sides in a plane above and in cooperative relation to said cutter bars.

5. A cultivator comprising a main frame supported for movement along the ground, a longitudinal hood disposed beneath the frame, said hood including a top and sides, a driven cross shaft mounted in connection with the frame adjacent the rear end of the hood, means pivotally mounting the hood for vertical adjustment about the driven shaft as an axis, vertically adjustable suspension means between the front end portion of the hood and the frame, a transversely extending earth digging plow unit secured between the sides of the hood adjacent the bottom and front thereof, a transversely extending grate secured between the sides rearwardly of the plow unit and in position to receive dug earth therefrom, the grate including longitudinal cutter bars, an earth chopping rotor journaled on and extending between the sides in a plane above and in cooperating relation to the grate, and drive means between said driven cross shaft and the rotor.

References Cited in the file of this patent

UNITED STATES PATENTS

| Number | Name | Date |
|---|---|---|
| 351,028 | Gilbert | Oct. 19, 1886 |
| 508,685 | Davy | Nov. 14, 1893 |
| 1,533,274 | Reynolds | Apr. 14, 1925 |
| 2,302,973 | Sargent | Nov. 24, 1942 |
| 2,554,498 | Patterson | May 29, 1951 |

FOREIGN PATENTS

| Number | Country | Date |
|---|---|---|
| 251,148 | Germany | June 17, 1911 |